United States Patent
Umstetter et al.

(10) Patent No.: US 7,042,991 B2
(45) Date of Patent: *May 9, 2006

(54) METHOD AND APPARATUS FOR EXTENDING A TELEPHONE'S CAPABILITIES

(75) Inventors: James S. Umstetter, Round Rock, TX (US); Elie A. Jreij, Pflugerville, TX (US)

(73) Assignee: Siemens Communications Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/045,172

(22) Filed: Jan. 27, 2005

(65) Prior Publication Data

US 2005/0129220 A1    Jun. 16, 2005

Related U.S. Application Data

(63) Continuation of application No. 09/239,414, filed on Jan. 28, 1999, now Pat. No. 6,862,347.

(51) Int. Cl.
*H04M 11/00* (2006.01)

(52) U.S. Cl. .............................. 379/93.05; 379/356.01; 379/399.01; 379/442

(58) Field of Classification Search ............. 379/93.05, 379/356.01, 399.01, 442
See application file for complete search history.

(56) References Cited

U.S. PATENT DOCUMENTS

| | | | |
|---|---|---|---|
| 5,003,580 | A | 3/1991 | Duong et al. |
| 5,097,528 | A | 3/1992 | Gursahaney et al. |
| 5,471,522 | A | 11/1995 | Sells et al. |
| 5,495,528 | A | 2/1996 | Dunn et al. |
| 5,530,894 | A | 6/1996 | Farrell et al. |
| 5,666,397 | A | 9/1997 | Lamons et al. |
| 5,727,047 | A | 3/1998 | Bentley et al. |
| 5,799,068 | A | 8/1998 | Kikinis et al. |
| 5,940,488 | A | 8/1999 | DeGrazia et al. |
| 6,021,187 | A | 2/2000 | Tombetti |
| 6,366,653 | B1 | 4/2002 | Yeh et al. |

FOREIGN PATENT DOCUMENTS

| | | |
|---|---|---|
| EP | 0 434231 | 6/1991 |
| WO | WO 90/13213 | 11/1990 |
| WO | WO 95/22183 | 8/1995 |
| WO | WO 99/35557 | 7/1999 |

*Primary Examiner*—Jefferey F. Harold

(57) ABSTRACT

An application programming interface (API) enables a telephone to utilize the hardware resources of a computer that is connected to the telephone in a master/slave relationship that causes the computer to function in the manner of a peripheral to the telephone. Specifically, the telephone attached to the computer can utilize the relatively large memory capacity of the attached computer to store excess telephone-specific data and can utilize the relatively high sophistication of the processing capability of the connected computer to perform intensive data processing operations. The API allows the functionality of the telephone to be extended without requiring a telephony-equipped computer.

10 Claims, 5 Drawing Sheets

METHOD AND APPARATUS FOR EXTENDING A TELEPHONE'S CAPABILITIES

CROSS-REFERENCE TO RELATED APPLICATIONS

This application is a continuation of application Ser. No. 09/239,414 filed on Jan. 28, 1999 now U.S. Pat. No. 6,862,347 of the same title.

TECHNICAL FIELD

The present invention relates generally to telecommunications and more particularly to the integration of telephones and computers.

DESCRIPTION OF THE RELATED ART

Most telephone functions can now be performed by computing devices, such as servers and/or desktop personal computers (PCs). Specifically, the field of computer telephony has evolved such that a computer can emulate the functions of a telephone by, for example, answering an unattended telephone and taking messages. As another example, the computer can emulate the functions of a traditional PBX by acting as an automatic call management and distribution center. Further, a properly equipped computer can be used as a telephone substitute. To enable a computer to emulate the functions of a telephone, a telephony application program interface (TAPI) residing within the computer is utilized to provide the interface between computer communications protocols and telephone network protocols. An example of a PC that is configured to perform computer telephony functions is shown in FIG. 1. The PC 12 of FIG. 1 is connected to a traditional telephone 14, a public switched telephone network (PSTN) 16, and optionally to a data network 18 such as a LAN. As shown in FIG. 1, the telephone is connected to the PSTN through the PC, instead of being directly connected to the PSTN.

The PC 12 of FIG. 1 includes standard PC devices, such as a processor, memory 22 and a data network input/output (I/O) device 24. The PC also includes a TAPI 28 that controls the computer telephony functions performed by the PC and an I/O device 26 that connects the PC to both the telephone 14 and the PSTN 16. In an arrangement such as in FIG. 1, the telephone can operate as a conventional telephone with the computer I/O device 26 supplying a direct connection between the telephone and the PSTN. Alternatively, the computer can be utilized as a telephone substitute if the computer is equipped with the appropriate microphone, speaker, and voice processing hardware and software. The telephone and computer can also be integrated to operate in conjunction with each other, with the TAPI controlling computer telephony applications. For example, the TAPI can be configured to answer incoming calls after a specific number of rings in a manner similar to a conventional answering machine, or the TAPI can be configured to answer every incoming telephone call, offering a caller a menu of options similar to an automated call distribution center. In the arrangement of FIG. 1, the TAPI-equipped PC supports the operation of the telephone with PSTN compatible functions.

A computer telephony-equipped system which is a modification of the system of FIG. 1 is disclosed in U.S. Pat. No. 5,799,068 entitled "Smart Phone Integration with Computer System," issued to Kikinis et al. (hereinafter Kikinis). As shown in FIG. 2, the PC 12 of Kikinis is equipped with a TAPI 28 that controls computer telephony functions. However, the telephone 14 in Kikinis, in contrast to the system of FIG. 1, is connected directly to a PBX 32 and the PC 12 is connected to the PBX through the telephone. Although the PC 12 is connected to the telephone 14 to support the telephone with computer telephony applications, the telephone does not rely on the computer to perform any of its telephone-specific operations.

As computer telephony technology has expanded, so too has telephone technology. For example, stand alone telephones exist that can answer and store messages, provide menu options, and perform automatic call distribution functions. Although telephones have expanded capabilities, they are often limited by cost and/or capacity of data that can be stored within the telephone or limited in the extent of data processing that can be performed by the telephone.

Thus, computer telephony technology may provide the extended functionality desired for many telephone applications, with the extended functionality being built around the computer as the interface point for all communications. However, although computers and telephones often sit side-by-side on the desktop, in most situations the telephones are unsupported by the computers and are still the primary interface point for communications. In view of this fact and in view of some of the limitations of conventional telephones, what is needed is a cost effective and manageable way to extend the capability of a traditional telephone.

SUMMARY OF THE INVENTION

A method and an apparatus for extending the capability of a telephone involve connecting the telephone to a nearby computer such that the telephone can utilize the hardware resources of the computer. During telephone operations, the computer functions in the same manner as a peripheral to the telephone, responding to instructions received from a processor resident in the telephone. In a preferred embodiment, the telephone receives incoming call data, recognizes that at least a portion of the call data needs to be stored, and determines whether to store the call data in memory located within the telephone or memory located within the computer. The telephone is also enabled to determine whether to process incoming call data within the telephone or utilize the computer's processing capability to execute at least a portion of the required tasks. By utilizing the relatively large memory capacity of the computer to store excess call-related data, such as voicemail messages, and by utilizing the relatively high sophistication of the computer to perform intensive data processing functions, such as voice recognition, the capability of a telephone can be significantly extended.

In a preferred system, a telephone is equipped with an application programming interface (API) that coordinates the transfer of data between the telephone and the attached computer. The telephone includes a processor, memory, and input/output (I/O) devices for connecting the telephone separately to a PSTN and to the computer. The API-equipped telephone can perform telephone functions independently of the computer, whether or not the computer is capable of computer telephony.

The computer attached to the telephone in the preferred system includes its own processor and memory. The computer processor is a conventional processor and the memory is conventional memory such as RAM and/or hard disk memory. The computer includes an input/output device that enables the telephone to be connected to the computer.

In one embodiment of the invention, the telephone utilizes the relatively large memory capacity of the computer to store call-related data. For example, the PC memory can be utilized by the telephone to store overflow voicemail messages and/or database information such as a telephone directory. The PC memory can be utilized by the telephone to archive old messages, to store various voicemail greetings, and/or to store speed dial numbers. In one operation, the API integrated into the telephone monitors the memory availability within the telephone and determines if and when call-related data should be transferred from the telephone to the PC for storage. Specifically, a stand alone telephone can manage a fixed amount of data in the form of voicemail messages and if the fixed amount of data is exceeded, the excess data is automatically transferred to the PC memory in order to prevent the data from being lost.

In another embodiment, the telephone utilizes the increased sophistication of processing capacity of the computer to handle processing-intensive operations or processing overflow. For example, a telephone may include menu options that allow a caller to select among a variety of operations. Under normal circumstances, a telephone processor can handle the menu options operations, but under high call traffic conditions the telephone performance may decline. To avoid performance problems, the API is configured to sense when the telephone's processing capability is being stretched and to automatically utilize the processing capability of the PC to supplement the processing capability of the telephone. Other telephone functionality that may require extended processing capability include automatic call distribution, voice-activated functions, and/or security functions such as voice pattern recognition.

An advantage of the invention is that with a minimum of additional hardware, the capability of a conventional desktop telephone can be extended by utilizing the relatively large storage and processing capability of a nearby personal computer. Another advantage of the invention is that the functionality of a telephone can be extended without requiring a computer that is capable of computer telephony functionality.

DETAILED DESCRIPTION

Figure 1:
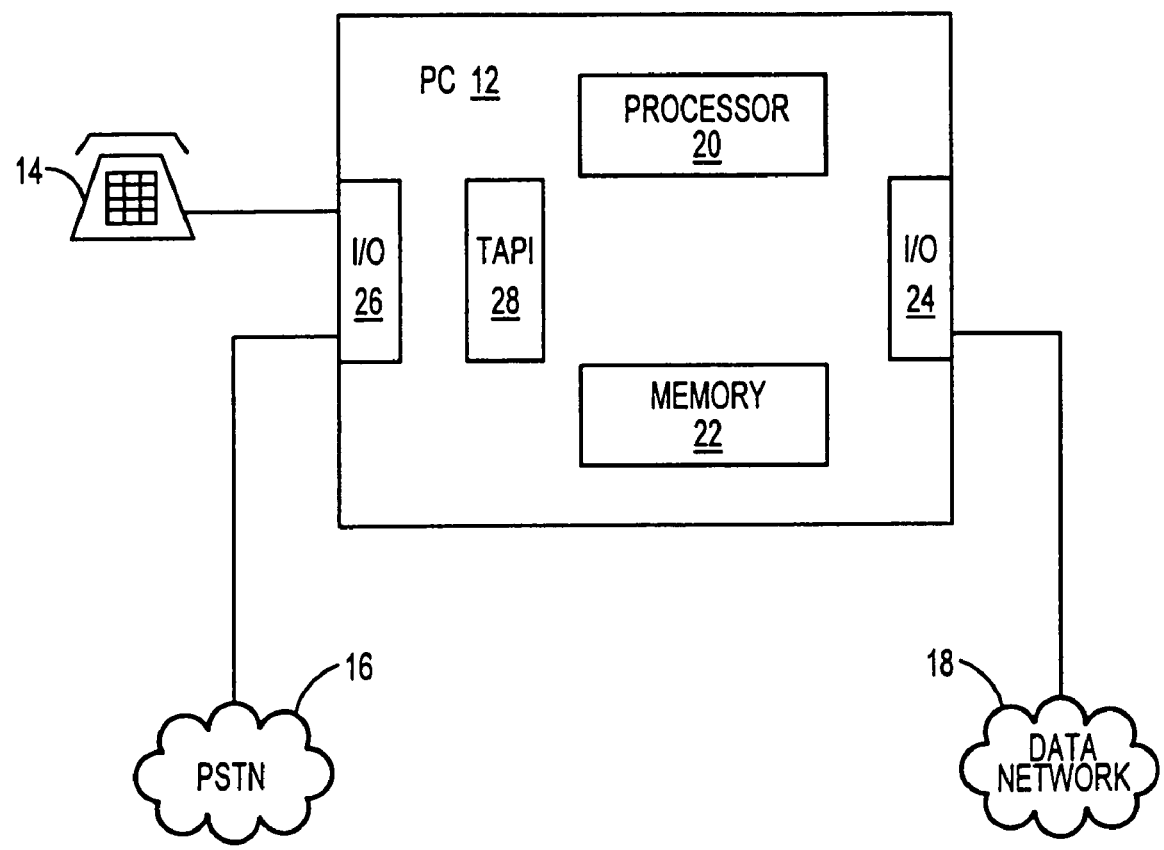
FIG. 1 is an example of a PC, connected directly to a PSTN, that is configured to perform computer telephony functions in accordance with the prior art.
Figure 2:
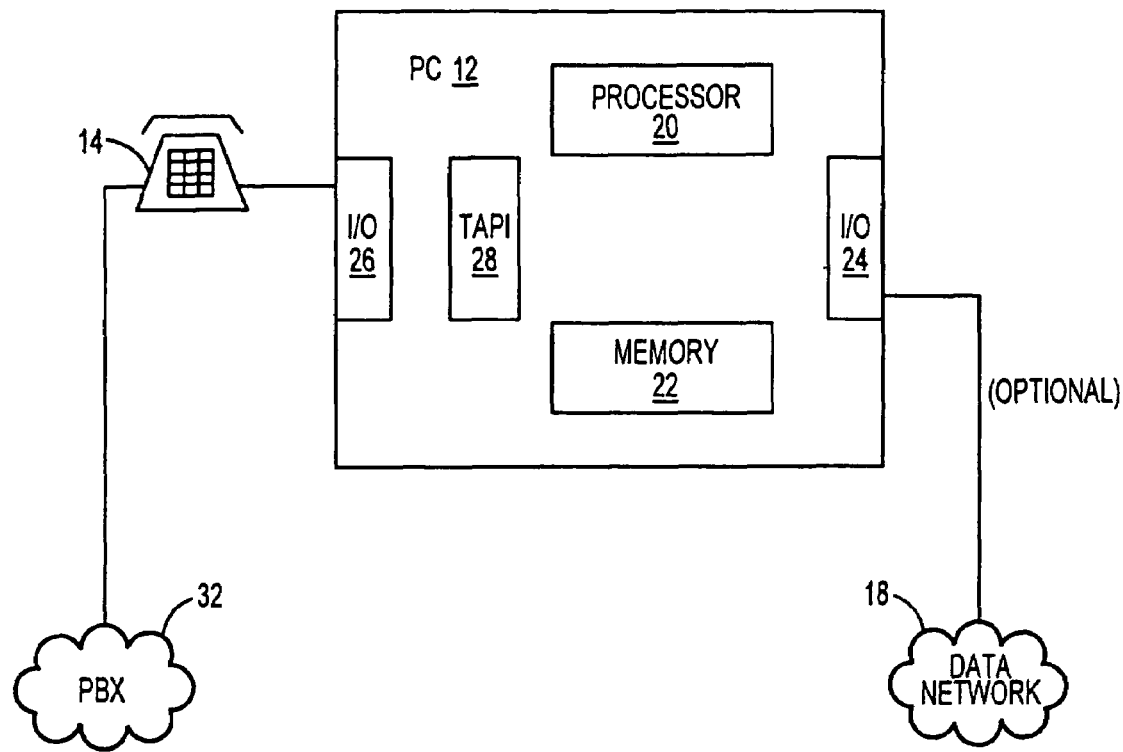
FIG. 2 is an example of a PC, connected to a PBX through a telephone, that is configured to perform computer telephony functions in accordance with the prior art.
Figure 3:
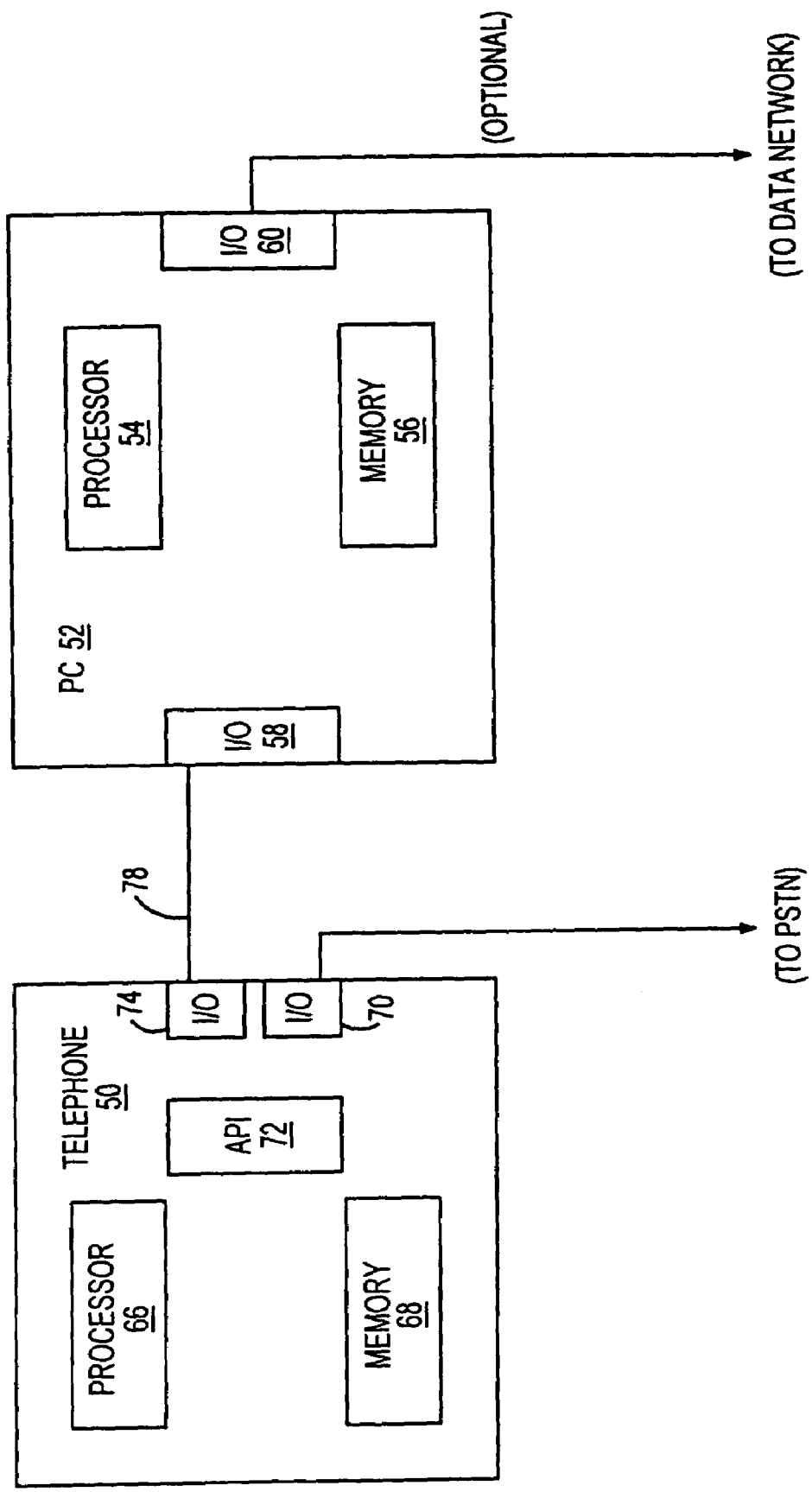
FIG. 3 is an expanded functional block diagram of a telephone and a PC that have been connected in accordance with the invention.

FIG. 3 is an expanded functional block diagram of a telephone 50 and a PC 52 that have been connected to each other in accordance with the invention. In the preferred embodiment, the PC is a device that includes a processor 54 and memory 56. The processor is a conventional processor and the memory is conventional memory such as RAM, hard disk memory, external drive memory, and/or any other memory that is associated with a PC. In the preferred embodiment, the processing capability and storage capacity of the PC are significantly greater than the processing capability and storage capacity of the telephone. The PC does not need to have computer telephony capability as previously described with reference to FIGS. 1 and 2. Moreover, in the preferred embodiment, the PC does not include a TAPI to provide computer telephony. The PC includes an I/O device 58 that allows the computer to interact with the telephone in accordance with the invention. The PC can optionally be connected, through another I/O device 60, to a network such as a data network, although it is not critical to the invention. In addition, although the computer is specified as a PC, other types of computers can be used, such as workstations and/or servers.

In the preferred embodiment, the telephone 50 is a stand alone digital and/or analog telephone that can operate independently of the computer. The telephone is connected directly to a PSTN and includes its own internal processor 66 and memory 68 that allow the telephone to perform conventional telephone operations. The processor is preferably integrated into one or more application specific integrated circuits (ASICs) and the memory may include read only memory (ROM) and/or random access memory (RAM). The telephone includes an I/O device 70 that connects the telephone to the PSTN. Alternatively, the telephone can be connected to a different telephone network, such as a private network. The telephone also includes an API 72 and an I/O device 74 that allow the telephone to interact with the PC 52 in accordance with the invention. The telephone is preferably located in the same workspace as the computer, with both the telephone and computer being utilized by the same person. For example, the telephone and computer are located in the same office and typically on the same desktop.

In accordance with the invention, the API 72 enables the telephone 50 to utilize the storage and/or processing capability of the PC 52. The API preferably resides in the telephone and offers various programmable parameters that can be controlled through interaction with a telephone keypad or an alternative interface mechanism on the telephone such as a touchpad. The API includes software and hardware that coordinates communications protocols and controls the transfer of data between the telephone and the computer. The API does not provide computer telephony functionality, rather the API enables the telephone to utilize hardware resources of the computer to extend the telephone's storage and processing capability.

Enabling the telephone 50 to utilize the relatively large memory capacity of the PC 52 significantly expands the memory capability of the telephone. In a preferred embodiment the PC memory 56 is utilized by the telephone as overflow memory. For example, the PC memory can be utilized by the telephone to store overflow voicemail messages and/or database information, such as telephone directories. The PC memory can also be utilized by the telephone to archive old messages, store various voicemail greetings, and/or store speed dial numbers.

In one operation, the telephone receives call-related data from the PSTN and recognizes that some of the call-related data needs to be stored for future recall. The API 72 integrated into the telephone 50 determines whether the call-related data should be stored within the telephone memory or the computer memory. To make the determination, the API monitors the memory availability within the telephone and compares the availability to a pre-established availability threshold. Upon reaching the pre-established availability threshold, the API directs additional incoming or outgoing call-related data to be transferred from the telephone 50 to the PC 52 for storage. For example, a stand alone telephone can store a fixed amount of data in the form of call parameters (caller ID, call status, etc.) and voice mail messages. If the fixed amount of data is exceeded, the excess data can be automatically transferred to the PC memory for storage, thereby preventing the data from being lost and extending the capability of the telephone.

In another operation, call-related data that is stored in the PC memory 56 from the telephone is accessed through the telephone 50 either manually or automatically. For example, a user can direct the telephone to scroll through a series of saved voicemail messages that reside within the PC memory. Alternatively, the voicemail messages can be automatically accessed from memory 56 of the PC 52 by the telephone and displayed on a telephone display in a manner in which it is transparent to the user that the data were stored within the computer.

Enabling the telephone 50 to utilize the processor capacity of the PC 52 greatly expands the processing capability of the telephone. In a preferred embodiment, the API 72 determines whether or not to utilize the processing capability of the computer. The API typically utilizes the PC processor 54 to perform more intensive processing or to provide overflow processing capability during periods of high call traffic. For example, the telephone may include menu options that allow a caller to select among a variety of operations. Under normal circumstances the telephone processor 66 can handle the menu options operation, but when call traffic is high, the telephone performance may decline. To avoid performance problems, the API can be configured to sense when the telephone's processing capability may be exceeded and then automatically utilize the processing capability of the PC 52 to simultaneously perform excess processing. Other telephone functionality that may require extended processing capability includes automatic call distribution, voice activated functions, and security functions such as voice pattern recognition. As with the storage function, the API can be configured to automatically utilize the PC's processing capability to, for example, ensure that performance problems are avoided.

In the preferred embodiment, the data connection 78 between the telephone 50 and the PC 52 is a physical connection. For example, standard 9 or 25 pin serial cable, or RS-232 or RS-485 compatible connections may be utilized. In an alternative embodiment, a wireless connection utilizing, for example, radio frequency or infrared energy may be used to transmit data between the telephone and the computer.

Figure 4:
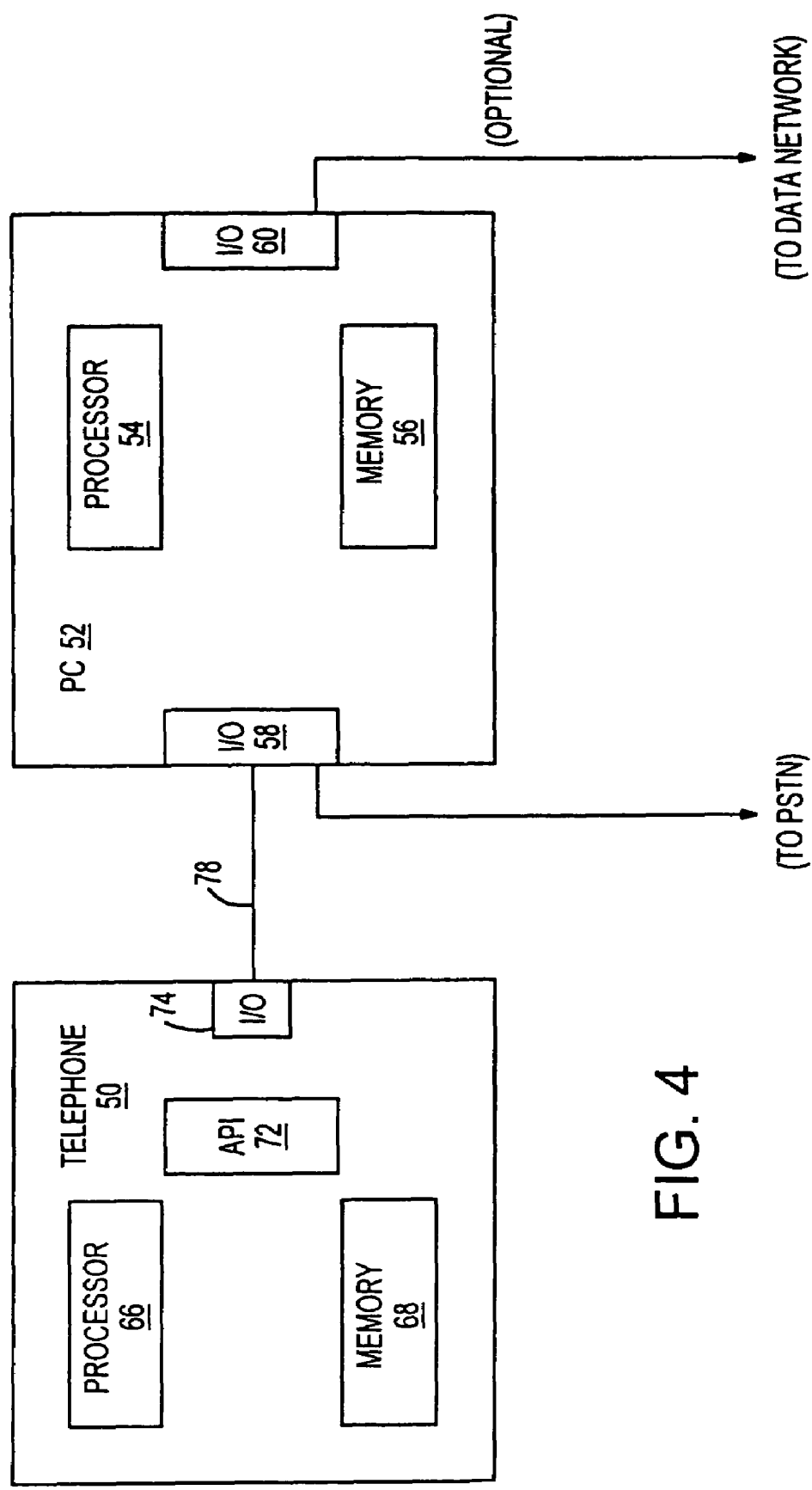
FIG. 4 is a depiction of the telephone and PC of FIG. 3 that have been connected to each other in accordance with an alternative embodiment of the invention.

FIG. 4 is a depiction of an alternative embodiment of the invention. In the embodiment of FIG. 4, the telephone 50 is connected to a telephone network indirectly through the I/O device 58 of the PC 52. The telephone can operate independently of the PC by bridging a connection between the telephone and the PSTN at the I/O device 58 of the computer. The telephone does not rely on computer telephony functions of the computer for operation and the API 72 within the telephone controls the telephone's utilization of the PC's relatively large memory and processing capability. As with the embodiment of FIG. 3 computer telephony capability in the computer is not required or relied upon.

Although the API 72 is described as residing within the telephone 50, the API can be configured to reside within the PC 52 or in both the PC and the telephone. In a preferred embodiment, the utilization of the PC's resources is transparent to a user of the telephone. However, in another embodiment, the telephone indicates when the resources of the PC are being utilized or need to be utilized. For example, if the PC is turned off and the telephone requires additional storage space, the telephone will prompt a user to turn on the computer. The API can be configured to function with analog telephones and analog telephone networks, as well as with digital telephones and digital telephone networks.

Figure 5:
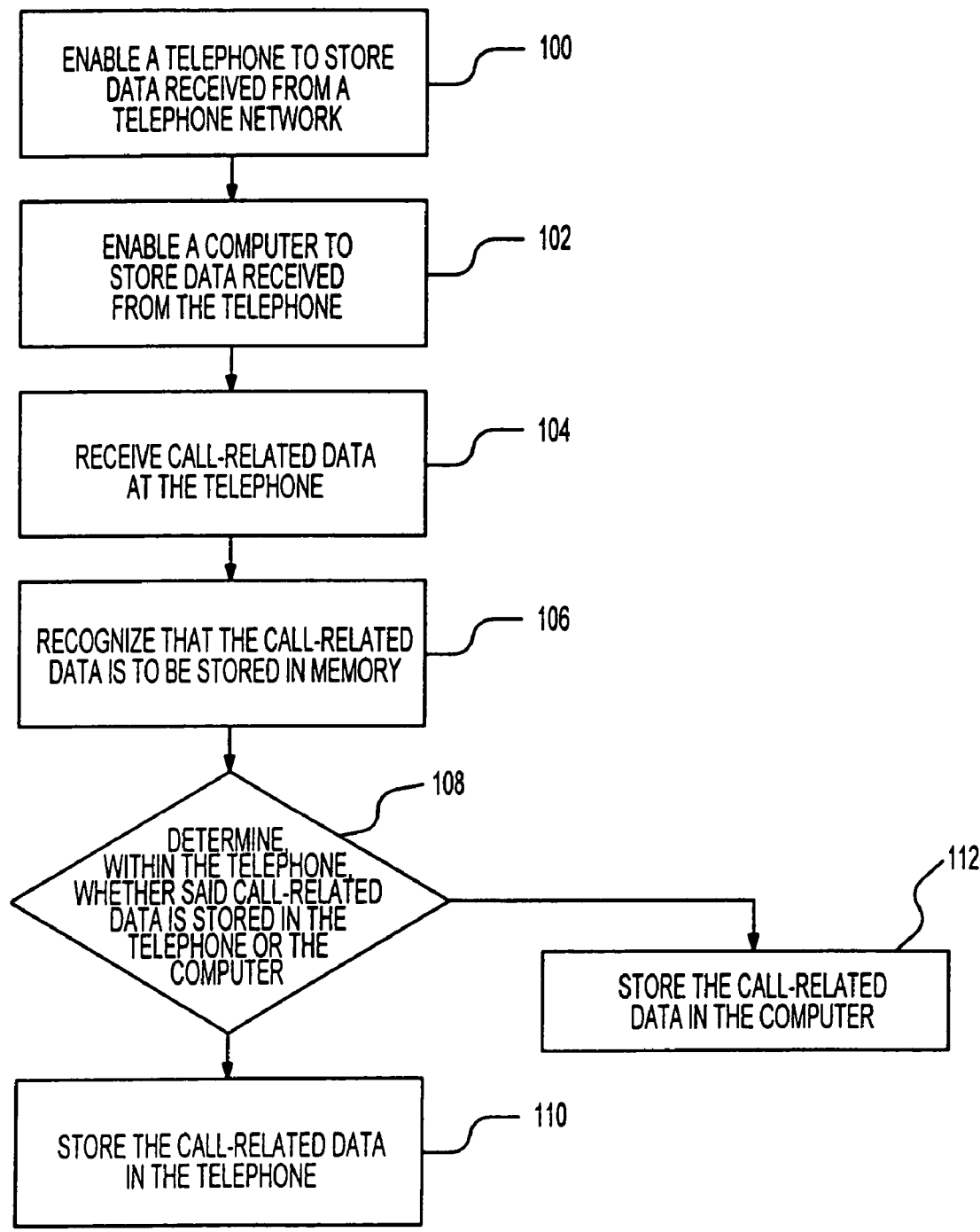
FIG. 5 is a process flow diagram of a preferred method for extending the capability of a telephone in accordance with the invention.

FIG. 5 is a process flow diagram of a preferred method for extending the capability of a telephone in accordance with the invention. In a step 100, a telephone is enabled to store data received from a telephone network. In a step 102, a computer is enabled to store data received from the telephone. In a step 104, call-related data is received at the telephone from the telephone network. In a step 106, the call-related data is recognized as data that should be stored in memory. At decision point 108, a decision is made within the telephone as to whether or not the call-related data should be stored in the telephone or the computer. Based upon the determination, either the call-related data is stored in the telephone at step 110, or the call-related data is stored in the computer at step 112.

What is claimed is:

1. An apparatus to extend the capability of a telephone, comprising:
    a first processor residing in said telephone;
    a first memory residing in said telephone and coupled to said first processor;
    a second processor residing in a computer;
    a second memory residing in said computer and coupled to said second processor;
    a first I/O device within said telephone and coupled to said first processor to receive call-related data from a telephone network; and
    an application program interface ("API"), residing in said telephone and coupled to said first processor, to determine whether said call-related data is to be further processed to provide a particular telephone function for continued handling of at least one current call, and to determine during said at least one current call whether said first processor or said second processor will perform the further processing, wherein this determination is unrelated to whether said call-related data will be stored in said first memory or said second memory.

2. The apparatus of claim 1 further comprising:
    a second I/O device within said computer and coupled to said second processor to receive said call-related data from said telephone.

3. The apparatus of claim 2 further comprising
    a direct data connection between said first I/O device and said second I/O device, wherein said telephone and said computer are structurally separate components.

4. The apparatus of claim 1 wherein said telephone is connected separately to said telephone network and said computer.

5. The apparatus of claim 1 wherein said computer lacks computer telephony capability.

6. An apparatus to extend the capability of a telephone, comprising:
    a first processor residing in said telephone;
    a first memory residing in said telephone and coupled to said first processor;

a second processor residing in a computer;
a second memory residing in said computer and coupled to said second processor;
a first I/O device within said telephone and coupled to said first processor to receive call-related data from a telephone network; and
an application program interface ("API"), residing in said telephone and coupled to said first processor, to determine whether said call-related data is to be further processed, and to determine, using automated processing capabilities of said telephone, whether said call-related data will be processed in said first processor or said second processor, wherein said determination is based upon current capabilities of said telephone and said computer other than storage capabilities.

7. The apparatus of claim 6 further comprising
a second I/O device within said computer and coupled to said second processor to receive said call-related data from said telephone.

8. The apparatus of claim 7 further comprising
a direct data connection between said first I/O device and said second I/O device, wherein said telephone and said computer are structurally separate components.

9. The apparatus of claim 6 wherein said telephone is connected separately to said telephone network and said computer.

10. The apparatus of claim 6 wherein said computer lacks computer telephony capability.

* * * * *